Sept. 30, 1952            K. J. WEISS            2,612,091
OPTICAL SYSTEM WITH AUTOMATIC PHOTOMETERING
AND DIAPHRAGM ADJUSTING MEANS
Filed May 31, 1950
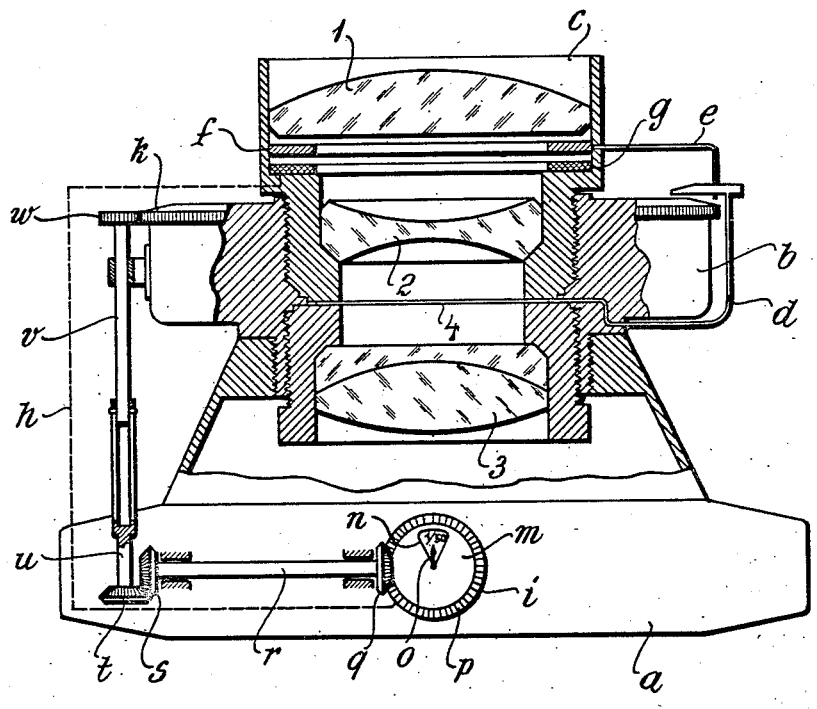
INVENTOR.
K. J. Weiss
BY Karl F. Ross
AGENT Patented Sept. 30, 1952

2,612,091

UNITED STATES PATENT OFFICE 2,612,091

OPTICAL SYSTEM WITH AUTOMATIC PHOTOMETERING AND DIAPHRAGM ADJUSTING MEANS

Karl Johann Weiss, Bad Kreuznach, Germany, assignor to Jos. Schneider & Co., Kreuznach, Germany Application May 31, 1950, Serial No. 165,140
In Germany February 9, 1950

2 Claims. (Cl. 95—10)

1

The present invention relates to an optical system for cameras, having means for automatically determining the luminous intensity of an object to be photographed and for adjusting the aperture of the camera diaphragm accordingly.

Heretofore, the measuring of the luminous intensity has usually been effected with the aid of photometers detached from the camera and designed as separate units. It has, however, already been proposed to attach the photometer to the camera interiorly or exteriorly thereof, such an arrangement requiring the use of a separate lens system projecting the beam of light upon a photocell; the required diaphragm opening is then indicated by a suitable pointer, or automatic means may be provided to translate the output of the photocell into the correct adjustment of the diaphragm control. Devices of this description are complicated and expensive, and their use in combination with studio cameras has been quite limited. Moreover, in the case of commercially available cameras of standard size and form it is generally impractical to attach additional equipment of major dimensions.

It is, accordingly, an object of the present invention to provide photometric means in a camera dispensing with the need for an additional lens system, thereby considerably simplifying the construction of the overall apparatus.

Another object of this invention is to provide a photometric system for standard cameras which modifies but slightly the construction of such cameras and does not add considerably to the complexity, cost and bulk thereof.

With these objects in view, the invention proposes to insert a photocell in the path of the light rays passing through the objective, advantageously between certain of the lenses forming the latter. If the camera is provided with a finder objective and an image objective, the photocell is preferably inserted in the path of the rays of the finder objective; again, in the case of a reflex camera having a single objective serving both as the finder objective and the image objective, the reflector or the ground glass may be suitably designed as a photocell.

The invention will be described with reference to the accompanying drawing the sole figure of which shows a top plan view, partly in section, of a conventional camera modified in accordance with the present improvement.

The camera shown in the drawing comprises a housing $a$, a shutter $b$ and a built-in image objective $c$, the latter consisting of a front lens $l$, an intermediate (defocusing) lens 2 and a compound rear lens 3. The lever $d$ for the adjustment of the usual diaphragm 4 is coupled with a lever $e$ for the adjustment of an auxiliary diaphragm $f$ which, according to a feature of the invention, is positioned ahead of the photocell $g$, shown here as of annular configuration and inserted between the lenses $l$ and 2 of the objective $c$. It will be noted that the diameter of the front lens $l$ has been increased over that of lenses 2 and 3 in order to direct sufficient light upon the photocell $g$ from which a wire $h$ extends toward a suitable indicator, schematically shown at $i$. Indicator $i$ may be, for example, a capillary electrometer or a galvanometer and has been shown mounted on top of the camera housing $a$.

The indicator $i$ is mechanically coupled with the control ring $k$ which times the length of exposure; in the embodiment illustrated, this is accomplished by means of a disk $m$, provided above the dial of the indicator $i$ and having a window $n$, which is to be rotated until the pointer $o$ appears in the window. This rotation is transmitted to the ring $k$ by means of a ring of bevel gear teeth $p$ provided at the periphery of the disk $m$, the teeth $p$ mating with a bevel gear $q$ on a shaft $r$ carrying another bevel gear $s$; the latter mates with a bevel gear $t$ on a telescoped spindle $u$, $v$ which via a pinion $w$ drives the toothed ring $k$.

It will be apparent that it will also be possible to substitute a fully automatic coupling between the pointer $o$ and the ring $k$ for the mechanism described above if a suitable source of power, e. g. the force of a spring, is available. Adjustment of the ring $k$ may, of course, also be effected manually with the aid of a conventional scale associated therewith, in accordance with the readings taken at the indicator $i$.

It will be noted that, with the embodiment described, the luminous intensity measured by the photocell will always be proportional to that appearing at the photosensitive surface.

The invention is not limited to the specific arrangement described and illustrated. Thus it may be mentioned that the photocell may be represented by a semi-transparent layer or a grid applied directly to one of the elements of the lens system, such as the lens $l$, and that similar grids or layers may be applied to the viewing surface (i. e. to the reflector or to the ground glass) in the case of reflex cameras of the type set forth above. In each case a coupling mechanism similar to the one described may be used.

What is claimed is:

1. In a camera, in combination, a first lens and at least one other lens together defining an objective, said first lens projecting annularly beyond said other lens, an annular photocell back of said first lens and substantially in register with the projecting portion thereof, thereby intercepting part of the light passing through said first lens while allowing a portion of said light to pass centrally of said photocell toward said other lens, a main diaphragm back of said photocell but forwardly of said other lens, said main diaphragm controlling the portion of said light passing toward said other lens, an auxiliary diaphragm between said first lens and said photocell controlling the amount of light intercepted by the photocell, and control means for simultaneously adjusting both of said diaphragms.

2. In a camera, in combination, a first lens and at least one other lens together defining an objective, said first lens projecting annularly beyond said other lens, an annular photocell back of said first lens and substantially in register with the projecting portion thereof, thereby intercepting part of the light passing through said first lens while allowing a portion of said light to pass centrally of said photocell toward said other lens, an adjustable main diaphragm back of said photocell but forwardly of said other lens, said main diaphragm controlling the portion of said light passing toward said other lens, and an adjustable auxiliary diaphragm between said first lens and said photocell controlling the amount of light intercepted by the photocell.

KARL JOHANN WEISS.

REFERENCES CITED

The following references are of record in the file of this patent:

UNITED STATES PATENTS

| Number | Name | Date |
|---|---|---|
| 1,993,084 | Brewer | Mar. 5, 1935 |
| 2,000,037 | Riszdorfer | May 7, 1935 |
| 2,163,737 | Prinsen | June 27, 1939 |
| 2,210,882 | Carter | Aug. 13, 1940 |
| 2,305,294 | Kuppenbender | Dec. 15, 1942 |
| 2,477,235 | Broido | July 26, 1949 |